United States Patent
Kuester

[19]

[11] Patent Number: 6,068,322

[45] Date of Patent: May 30, 2000

[54] PERSONAL PROTECTION

[76] Inventor: Stephen Michael Kuester, 20 Farraxton Square, Camp Hill, Northampton NN4 9RQ, United Kingdom

[21] Appl. No.: 08/981,777

[22] PCT Filed: Jun. 7, 1996

[86] PCT No.: PCT/GB96/01348

§ 371 Date: Feb. 3, 1998

§ 102(e) Date: Feb. 3, 1998

[87] PCT Pub. No.: WO96/40546

PCT Pub. Date: Dec. 19, 1996

[30] Foreign Application Priority Data

Jun. 7, 1995 [GB] United Kingdom .................. 9511505

[51] Int. Cl.[7] ........................................... B60J 1/02
[52] U.S. Cl. ................. 296/97.21; 454/120; 454/141; 454/158
[58] Field of Search .................... 296/97.21; 454/69, 454/120, 141, 156, 158, 162, 907; 297/184.13

[56] References Cited

U.S. PATENT DOCUMENTS

| | | | |
|---|---|---|---|
| 1,770,841 | 7/1930 | Clyman | 296/97.21 X |
| 3,193,322 | 7/1965 | Hines | 296/78.1 |
| 3,227,484 | 1/1966 | Merclean | 296/78 |
| 3,496,703 | 2/1970 | MacLeod et al. | 55/234 |
| 3,878,570 | 4/1975 | Donnelly | 5/97 |
| 4,804,140 | 2/1989 | Cantrall | 454/141 |
| 4,870,895 | 10/1989 | Mayer | 454/141 |
| 5,413,528 | 5/1995 | Pabst et al. | 454/141 X |
| 5,779,536 | 7/1998 | McCorkel et al. | 454/141 X |

FOREIGN PATENT DOCUMENTS

| | | |
|---|---|---|
| 0 339 902 A2 | 11/1989 | European Pat. Off. . |
| 42 41 233 A1 | 9/1994 | Germany . |
| 481645 | 3/1938 | United Kingdom . |
| 507623 | 6/1939 | United Kingdom . |
| 2 204 282 | 11/1988 | United Kingdom . |

OTHER PUBLICATIONS

A collection of searches and abstracts.

*Primary Examiner*—Joseph D. Pape
*Attorney, Agent, or Firm*—Davis and Bujold

[57] ABSTRACT

A transparent canopy (7) covers an infant seated within a baby-buggy for protecting him/her from exposure to ambient-air pollution, and a powered filter-unit (9) blows filtered ambient-air into the top of the compartment (8) between the canopy (7) and the seat-unit (4). The bottom of the compartment (8) is open where a lower, apron portion (16) of the canopy (7) hangs spaced from the seated-infant's legs. Entry of polluted air via the opening is blocked by operating the powered filter-unit (9) to create positive pressure within the compartment (8) so that the filtered air flows downwardly of the infant's face and body; a mesh inset (20) in the canopy (7) gives balanced ventilation and avoids heat build-up. The seat-unit (4) involves a back panel (25) suspended by fabric sections (26–28) within a frame (5). The panel (25) can be unlatched (29) to adapt the seat-unit (4) for use as a carry-cot.

16 Claims, 2 Drawing Sheets

PERSONAL PROTECTION

This invention relates to personal protection for infants.

The invention is concerned especially with affording infants protection against air pollution when for example in a pram, baby-buggy or carry-cot.

Babies and other infants when transported in a pram, baby-buggy or carry-cot in the street are often exposed to air that is polluted with high levels of motor-vehicle exhaust fumes. The levels of pollution to which they are exposed are generally higher than those experienced by adults since the infant breathes air from a lower level, closer to the source of emission of the fumes into the atmosphere. The matter is of particular concern because an infant is physically less able even than an adult to cope with pollution and is more likely to develop respiratory disorders from exposure to exhaust fumes.

Equipment for affording an infant protection against ambient-air pollution in a pram is known from DE-A-4241233 and involves a portable unit containing an air-filter and a motorised fan, that attaches to the side of the pram. The hood of the pram is raised and a transparent sheet is used to close off the inside of the pram from the ambient atmosphere. Filtered air supplied from the unit is blown into the interior of the pram through the sheet near the top of the hood, via a hose connection. Although air outlets are provided in the sheet for ventilation, they are located where the sheet covers the opening to the hood and not spaced significantly in relation to the infant from where the air enters through the hose-connection. There is accordingly the problem of the likelihood of air stagnation within the pram, and the consequent danger that the filtered air will not reach the infant; this problem is increased by the high location of the hose-connection in the hood.

It is an object of the present invention to provide equipment for affording an infant protection against ambient-air pollution, that reduces to a significant extent the likelihood of air stagnation.

According to the present invention there is provided equipment for affording an infant protection against ambient-air pollution, in which a compartment for enclosing the infant involves an elongate base-support which is of a configuration to support the infant in an appropriate sitting or other posture within the compartment, and a canopy that is transparent throughout at least a substantial part thereof, for extension over the infant on the base-support to close-up the compartment except for at least one or more openings at which the compartment is vented freely to the ambient atmosphere, and in which the equipment also includes motorised means carried with the base-support for blowing filtered ambient-air into the compartment at a location spaced from said one or more openings to create positive pressure in the compartment relative to the ambient air-pressure, the equipment being characterised in that the motorised means is located at one end of the base-support for blowing the filtered air into the compartment to flow towards the other end lengthwise of the infant on the base-support, and that said one or more openings are located towards or at said other end of the base-support.

The canopy may extend fully over the base-support, and may comprise flexible transparent sheeting supported on arched stays that are pivotable for selective extension of the canopy over the base-support. An element of mesh may be inset into the canopy for venting air from the compartment and avoiding build up of heat within the compartment.

The base-support, which may be mounted on a wheeled chassis, may be of an elongate dished configuration and may be suspended within an open frame element that carries the canopy. More particularly, it may include a substantially-rigid panel that is suspended on fabric sections which define walls of the base-support; one of the sections may provide a seat for the infant, with the panel as backrest.

For seating the infant, the base-support may be mounted to have an inclined attitude, and in these circumstances the means for blowing the filtered ambient-air into the compartment may be mounted at the upper, head end of the base-support to blow the filtered air to flow downwardly of the base-support within the compartment. In the latter circumstances, the canopy may extend over the base-support to hang down away from, and beneath, the other, lower end of the base-support as an apron for the infant's legs leaving the compartment open at that end.

The means for blowing filtered air into the compartment may comprise a filter and a battery-powered electric fan for drawing ambient-air through the filter. The filter may include a dust filtrant for removing particulates from the ambient-air.

A baby-buggy equipped in accordance with the present invention to afford an infant protection against ambient-air pollution, will now be described, by way of example, with reference to the accompanying drawings, in which.

Figure 1:
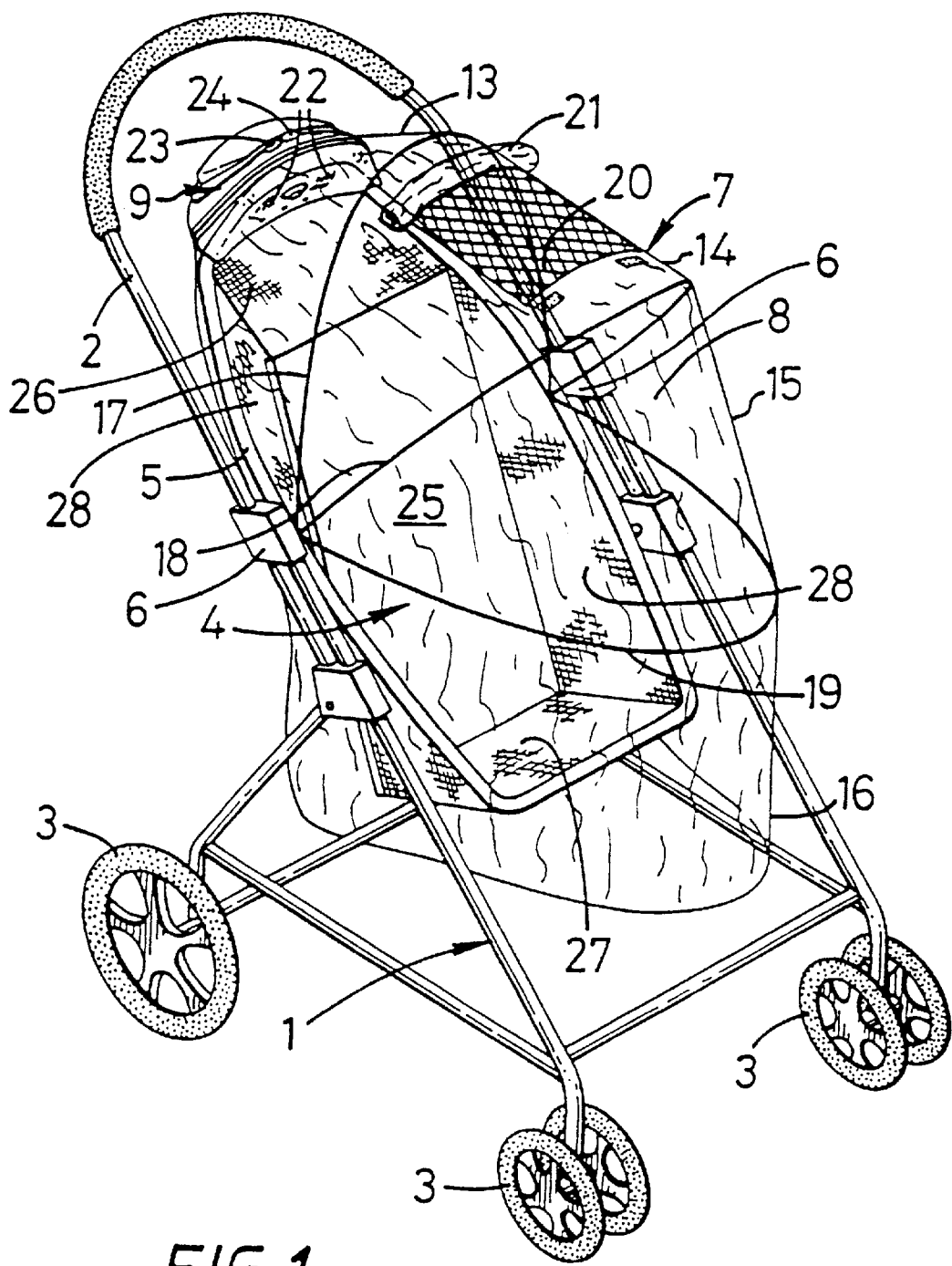
FIG. 1 is a general perspective view of the baby-buggy according to the invention.

Referring to FIG. 1, the baby-buggy has a tubular-metal chassis 1 that is fitted with a tubular-metal handle 2 for pushing and maneuvering the buggy on the wheels 3 of the chassis 1. An elongate seat-unit 4 for supporting the infant in a sitting or reclining posture, is mounted on a generally-elliptical frame 5 that is hung within the chassis 1 from two diametrically-opposed pivot mounts 6.

To the extent the buggy has so far been described it is of a generally conventional form, and any infant carried in it near motor vehicles would, because of his/her location low down, be closely exposed to exhaust-fume emissions from those vehicles. The buggy of the present invention, however, acts to minimise such exposure, and in this respect incorporates a transparent plastics-sheeting canopy 7 that in conjunction with the unit 4 defines a compartment 8 to enclose the infant. A powered filter-unit 9 mounted on the frame 5 blows filtered air into the compartment 8 to ensure that the compartment 8 is kept substantially free of pollution, for protection of the infant.

Figure 2:
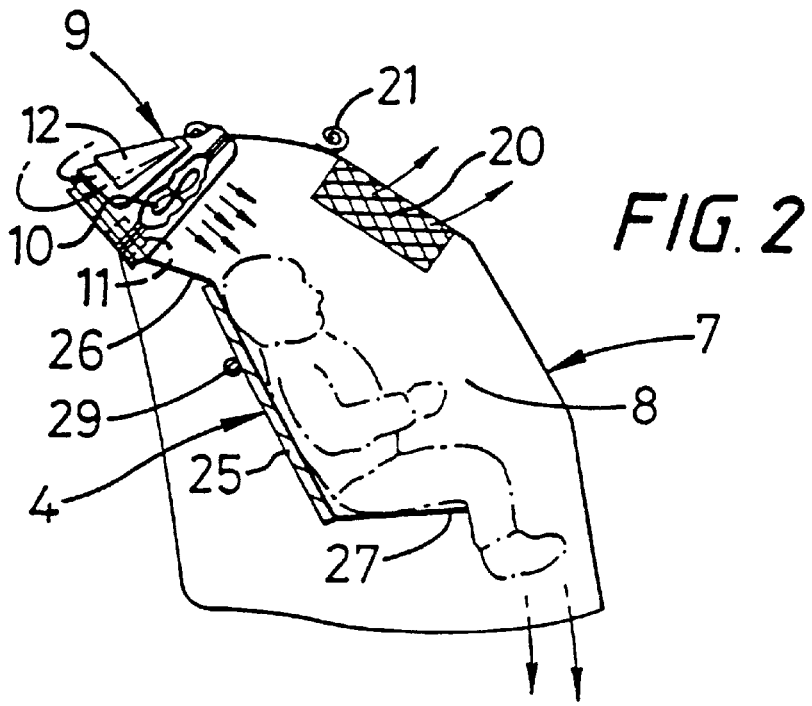
FIG. 2 is a schematic illustration showing operation of equipment of the baby-buggy of FIG. 1 for affording an infant protection against ambient-air pollution.

The powered filter-unit 9 includes, as illustrated in FIG. 2, a fan 10 that is powered from a rechargeable or standard battery 11 to draw ambient-air through a filter 12 and blow it into the compartment 8 at the head of the unit 4. The filter 12, which includes a dust-filtrant and polyurethane foam impregnated with carbon spheres or carbon-impregnated cloth, is effective to remove pollutants (particulates, together with carbon-, nitrogen- and sulphur-dioxide, and hydrocarbons) to a substantial extent from the ambient-air so that the filtered air blown into the compartment 8 defined within the canopy 7, is of significantly-enhanced breathability.

The canopy 7 is made up of three flexible gores 13 to 15 and an apron portion 16 all of clear polyvinyl chloride sheets that are sewn and sealed together on three flexible rods or stays 17 to 19. The stays 17 to 19 are arched with the two ends of each pivoted to the frame 5 to enable them to be opened out from one another to stretch the sheeting of the gores 13 to 15 taut and close-up the compartment 8. In this respect, the gore 13 is attached to the unit 9 and also to the frame 5, but the canopy 7 is otherwise free of close attachment below this so that the apron portion 16 hangs round, but spaced from, the infant's legs and lower part of the body; provision may be made for securing the sheeting of the apron portion 16 to the chassis 1 to maintain the spacing, if necessary. The lack of sealing and the spacing of the apron portion 16, ensures that the compartment 8 as a whole is adequately ventilated. However, additional ventilation is provided through a mesh inset 20 in the gore 14 above the infant's head. The inset 20 also provides a degree of shading from the sun; in inclement weather a rolled-up cover 21 attached to the gore 14 can be unrolled and secured across the inset 20 to protect the infant.

The possibility of entry of ambient, polluted air into the compartment 8, is obviated by operating the unit 9 to maintain a positive pressure within the compartment 8 with respect to the ambient air-pressure. The filtered-air outlet 22 of the unit 9 is set back slightly over the infant's head at the top of the compartment 8, and waste air is vented to atmosphere through the open lower-part of the canopy 7 provided by the apron portion 16, so that a good air-flow is established downwardly of the infant's face and body. The added, balanced ventilation through the mesh-inset 20 helps further to ensure that there is no build up of carbon dioxide, or of heat, within the compartment 8. The filter 12 opens from the top of the unit 9 away from the discharge of air through the mesh 20, and the unit 9 incorporates indicators 23 and 24 for showing respectively the state of charge of the battery 11 and air flow into the compartment 8 so as to enable operation of the equipment to be readily monitored. Provision may also be made for an audio alarm that warns when the state of charge of the battery 11 is low.

The seat-unit 4 has a substantially rigid back formed by a fabric-covered panel 25 that is suspended within the frame 5 by top and bottom sections 26 and 27, and two side-wall sections 28, all of fabric. The section 27 provides the seat of the unit 4, and the panel 25 is tipped slightly forward within the frame 5 by lugs 29 (FIG. 2) that latch to the frame 5, so that the section 26 above the infant's head is angled back slightly to the unit 9. The lower portions of the side-wall sections 28 rise up either side of the panel 23 to afford arm restraint and side-protection for the infant seated on the panel 25 within the unit 4. The orientation of the unit 4 as a whole on the chassis 1 can be adjusted between that suitable for the infant to sit up (as illustrated) or to recline backwardly for sleep.

Figure 3:
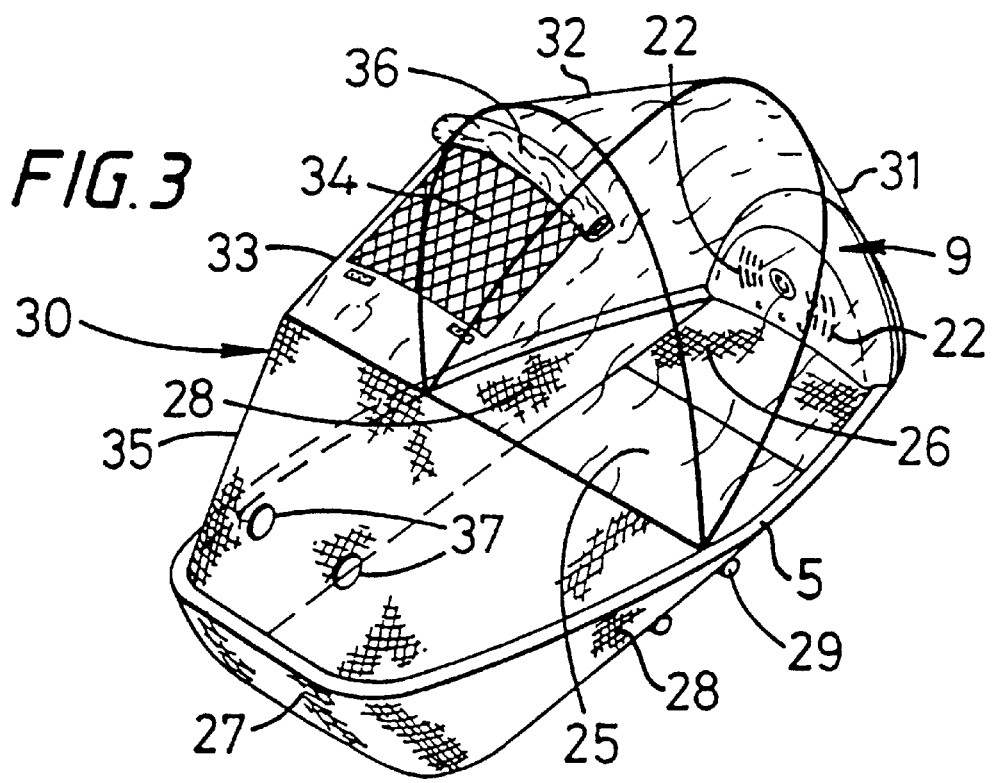
FIG. 3 is a perspective view of the seat-unit of the baby-buggy of FIG. 1 adapted for use as a carry-cot.

According to an advantageous feature of the buggy, seat-unit 4 can be readily adapted for use in the form of a carry-cot mounted substantially horizontally on the chassis 1; the age range for which the buggy can be utilised is thereby extended to cover the period before the infant can sit. For such use the lugs 29 are unlatched from the frame 5 so that, as illustrated in FIG. 3, the panel 25 hangs on the fabric section 27 and side-wall sections 28, flat with the section 26 within the frame 5. The infant is placed on the panel 25 within the unit 4 with its head towards the section 27 and feet extending towards the unit 9. The unit 9 is operated in the same manner as previously described to maintain a positive air pressure within the compartment, but the canopy 7 is replaced by a canopy 30.

The canopy 30 has three transparent gores 31 to 33 with a mesh inset 34 for enhanced ventilation in the gore 33. However, instead of having an apron-opening around the section 27, the canopy 30 has a fabric gore 35 that attaches to the frame 5. Adequate ventilation is provided even when the inset 34 is covered by its rolled-up cover 36, through holes 37 in the gore 35. The holes 37 ensure that there is good flow of air over the infant from the unit 9.

The seat-unit 4 when configured as in FIG. 1 for sitting or reclining, or as in FIG. 3 as a carry-cot, may be removed from the chassis 1, for use independently thereof. There is no disturbance to the unit 9 in this or any other use, so operational effectiveness and integrity in keeping the infant's environment substantially free from the ambient-air pollutants, is maintained.

Although the invention has been described above in terms of protection against traffic-produced pollution, it may also be used to protect infants against pollen and other allergens in the atmosphere.

What is claimed is:

1. Equipment for affording an infant protection against ambient air pollution, the equipment comprising:

(a) an elongate compartment to define a substantially enclosed space for accommodating an infant, said compartment having first and second ends separated from one another lengthwise of the compartment and an opening located at said first end, said opening venting said substantially enclosed space freely to ambient atmosphere at said first end of the compartment, the compartment comprising an elongate base support having a configuration for supporting an infant in at least a sitting posture, and a canopy for extension over the base support to define said substantially enclosed space in combination with the base support, said canopy being transparent throughout at least a substantial portion thereof;

(b) means mounting the compartment with an inclined attitude for seating the infant with said second end of the compartment above said first end and the infant's legs projecting through said opening; and (c) motorized means carried with the base support for blowing filtered ambient air into the compartment to create positive pressure in said substantially enclosed space relative to ambient atmosphere, the motorized means being located at said second end of the compartment to blow the filtered air into the substantially enclosed space to flow lengthwise of the compartment towards said first end;

wherein said canopy has a portion extending over the base support at said first end to define an apron, and said apron hanging down over said opening for covering the infant's legs.

2. Equipment according to claim 1 wherein the base-support is of an elongate dished configuration, and said equipment includes an open-frame element, means mounting the canopy on said element, and means suspending said base-support within said open-frame element.

3. Equipment according to claim 1 wherein the base support is mounted on a wheeled chassis.

4. Equipment according to claim 1 wherein the means for blowing filtered air into the compartment comprises a filter and a battery powered electric fan for drawing ambient air through the filter.

5. Equipment according to claim 4 wherein the filter includes a dust filtrant for removing particulates from the ambient air drawn through the filter.

6. Equipment according to claim 1 including means for mounting the compartment to have an inclined attitude for seating the infant with said second end above said first end, and wherein the means for blowing filtered ambient-air into said substantially-enclosed space is mounted on the base-support at said second nd of the compartment to blow the filtered air to flow downwardly of the base-support within the compartment.

7. Equipment for affording an infant protection against ambient air pollution, comprising:
   (a) an elongate compartment to define a substantially enclosed space for accommodating an infant, said compartment having first and second ends separated from one another lengthwise of the compartment and an opening located at said first end, said opening venting said substantially enclosed space freely to ambient atmosphere at said first end of the compartment, the compartment comprising an elongate base support having a configuration for supporting an infant in at least a sitting posture, and a canopy for extension over the base support to define said substantially enclosed space in combination with the base support, said canopy being transparent throughout at least a substantial part thereof; and
   (b) motorized means carried with the base support for blowing filtered ambient air into the compartment to create positive pressure in said substantially enclosed space relative to ambient atmosphere, the motorized means being located at said second end of the compartment to blow the filtered air into the substantially enclosed space to flow lengthwise of the compartment towards said first end;
   wherein said base support is of an elongate dished configuration, and said equipment further includes an open frame element, means mounting the canopy on said element, and means suspending said base support within said open frame element.

8. Equipment according to claim 7 wherein the canopy comprises flexible transparent sheeting, arched stays for supporting the sheeting, and means pivoting said stays on the base support for selective extension of the canopy over the base support.

9. Equipment according to claim 7 wherein the canopy extends to cover the base support fully.

10. Equipment according to claim 7 including means mounting said open frame element on a wheeled chassis.

11. Equipment for affording an infant protection against ambient air pollution, the equipment comprising:
    (a) an elongate compartment to define a substantially enclosed space for accommodating an infant, said compartment having first and second ends separated from one another lengthwise of the compartment and an opening located at said first end, said opening venting said substantially enclosed space freely to ambient atmosphere at said first end of the compartment, the compartment comprising an elongate base support having a configuration for supporting an infant in at least a sitting posture, and a canopy for extension over the base support to define said substantially closed space in combination with the base support, said canopy being transparent throughout at least a substantial part thereof; and
    (b) motorized means carried with the base support for blowing filtered ambient air into the compartment to create positive pressure in said substantially enclosed space relative to ambient atmosphere, the motorized means being located at said second end of the compartment to blow the filtered air into the substantially enclosed space to flow lengthwise of the compartment towards said first end; and
    (c) the equipment further including means for mounting the compartment to have an inclined attitude for seating the infant with said second end above said first end, and wherein the means for blowing filtered ambient air into said substantially enclosed space is mounted on the base support at said second end of the compartment to blow the filtered air to flow downwardly of the base support within the compartment.

12. Equipment according to claim 11 wherein the canopy extends over the base support to hang down away from, and beneath, the base support as an apron for the infant's legs leaving the compartment open at said first end.

13. Equipment according to claim 11 wherein the base support comprises a substantially rigid panel, and fabric sections for suspending the panel to define walls of the base support.

14. Equipment according to claim 13 wherein one of said fabric sections provides a seat for the infant with the panel as backrest.

15. Equipment according to claim 13 wherein an element of mesh is inset into the canopy for venting air from the compartment.

16. Equipment according to claim 11 including means for mounting said compartment on a wheeled chassis.

* * * * *